United States Patent
Venkitanarayanan et al.

(10) Patent No.: US 10,697,432 B2
(45) Date of Patent: Jun. 30, 2020

(54) WIND FARM ENERGY STORAGE DEVICE FOR CURTAILMENT AND AUXILIARY LOADS USE

(71) Applicant: General Electric Company, Schenectady, NY (US)

(72) Inventors: Vaidhya Nath Venkitanarayanan, Schenectady, NY (US); Pedro Arsuaga Santos, Greenville, SC (US); Megan Ann DeWitt, Boston, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/054,393

(22) Filed: Aug. 3, 2018

(65) Prior Publication Data
US 2020/0040874 A1 Feb. 6, 2020

(51) Int. Cl.
F03D 7/04 (2006.01)
H02S 10/12 (2014.01)
(Continued)

(52) U.S. Cl.
CPC ............... *F03D 7/048* (2013.01); *F03D 9/11* (2016.05); *F03D 9/255* (2017.02);
(Continued)

(58) Field of Classification Search
CPC ............ F03D 7/048; F03D 9/11; F03D 9/255
See application file for complete search history.

(56) References Cited

U.S. PATENT DOCUMENTS 6,819,086 B2 * 11/2004 Wobben .................. H02J 9/061
320/166
7,355,294 B2 * 4/2008 Teichmann ........... F03D 7/0224
290/44
(Continued)

FOREIGN PATENT DOCUMENTS

DE 10 2012 113049 A1 6/2014
EP 2 101 392 A2 9/2009
(Continued)

OTHER PUBLICATIONS

Extended European Search Report, dated Dec. 5, 2019.

*Primary Examiner* — Sean Gugger
(74) *Attorney, Agent, or Firm* — Dority & Manning, P.A.

(57) ABSTRACT

A method for operating at least one energy storage device of a renewable energy facility connected to a power grid in multiple operational modes includes providing an operational threshold for the renewable energy facility. Further, the method includes comparing an operational parameter of the renewable energy facility with respect to the operational threshold. The method also includes controlling the renewable energy facility based on the comparison. As such, when the operational parameter is below the operational threshold, the controller communicates to the energy storage device(s) to increase its state of charge (SOC) in anticipation of the renewable energy facility transitioning from producing power to consuming power. In contrast, when the operational parameter is at or above the operational threshold, the controller communicates to the energy storage device(s) to decrease its state of charge (SOC) in anticipation of a curtailment event of the power grid to prevent the renewable energy facility from releasing and sending power to the power grid.

14 Claims, 8 Drawing Sheets

(51) Int. Cl.
*F03D 9/11* (2016.01)
*F03D 9/25* (2016.01)
*H02J 9/06* (2006.01)
*H02J 11/00* (2006.01)

(52) U.S. Cl.
CPC ..... *F05B 2260/42* (2013.01); *F05B 2270/337* (2013.01); *H02J 9/062* (2013.01); *H02J 11/00* (2013.01); *H02S 10/12* (2014.12)

(56) References Cited

U.S. PATENT DOCUMENTS

| | | | |
|---|---|---|---|
| 7,740,448 B2 | 6/2010 | Meyer et al. | |
| 7,952,232 B2 | 5/2011 | Burra et al. | |
| 8,344,533 B2* | 1/2013 | Edenfeld | F03D 7/0224 |
| | | | 290/44 |
| 8,742,609 B2 | 6/2014 | Helle et al. | |
| 9,086,048 B2 | 7/2015 | Roesmann et al. | |
| 9,303,625 B2 | 4/2016 | Wobben | |
| 9,677,540 B2 | 6/2017 | Burra et al. | |
| 9,793,756 B2 | 10/2017 | Palomares Rentero et al. | |
| 2009/0295162 A1 | 12/2009 | Oohara et al. | |
| 2010/0259210 A1* | 10/2010 | Sasaki | H02J 3/32 |
| | | | 320/101 |
| 2011/0025059 A1* | 2/2011 | Helle | F03D 7/0224 |
| | | | 290/44 |
| 2012/0306202 A1* | 12/2012 | Takahashi | F03D 7/028 |
| | | | 290/44 |
| 2014/0316592 A1* | 10/2014 | Haj-Maharsi | F03D 7/0284 |
| | | | 700/287 |
| 2015/0028593 A1* | 1/2015 | Wobben | F03D 7/0204 |
| | | | 290/44 |
| 2015/0184632 A1* | 7/2015 | Sagi | F03D 7/048 |
| | | | 290/44 |
| 2015/0240784 A1* | 8/2015 | Sagi | F03D 7/048 |
| | | | 700/287 |
| 2016/0352102 A1* | 12/2016 | Zhao | H02J 1/10 |
| 2017/0074244 A1* | 3/2017 | Huang | H02J 3/386 |
| 2017/0373533 A1* | 12/2017 | Beekmann | F03D 7/026 |
| 2018/0152131 A1* | 5/2018 | Vidhi | F03D 9/255 |
| 2019/0148943 A1* | 5/2019 | Scott | H02J 3/28 |
| | | | 307/17 |

FOREIGN PATENT DOCUMENTS

| | | |
|---|---|---|
| EP | 1752659 B2 | 6/2017 |
| JP | 5 625005 B2 | 11/2014 |
| WO | WO 2015/196482 A1 | 12/2015 |

* cited by examiner

WIND FARM ENERGY STORAGE DEVICE FOR CURTAILMENT AND AUXILIARY LOADS USE

FIELD

The present subject matter relates generally to energy storage devices and, more particularly, to energy storage devices for wind farms that can be easily used to accommodate both curtailment and auxiliary loads.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a main shaft coupling the rotor blades to a gearbox, or if a gearbox is not used, directly to the generator. The generator then converts the mechanical energy to electrical energy that may be deployed to a utility grid.

Energy storage devices (ESDs) are often used in wind and solar farms to fulfill a specific use case. ESDs could be batteries, supercapacitors, pumped storage, compressed gas storage, flywheels, and/or any other device in which, or means by which energy can be stored for later use. A typical use case for ESDs in a wind farm is to store the energy produced by the wind turbines when the wind farm is curtailed by the grid operator and to release and sell the energy when the curtailment is lifted. Oftentimes, the timing of such curtailment events is not predictable by the wind farm operators. This unpredictability necessitates that the ESDs be kept at a very low state of charge (SOC) in anticipation of a curtailment event.

ESDs can also be used to supply the energy consumed by the auxiliary loads and losses inside the wind farm. Auxiliary loads represent the energy consumed by the devices inside the wind turbine such as yaw motors, various pumps, and heaters. Auxiliary losses represent the energy consumed by the no-load losses in the cables and the transformers in the wind farm. When the wind farm is producing power, the energy output of the wind farm to the grid is net of the above auxiliary loads and losses. When the wind speeds are low and the wind farm is not generating power, the wind farm consumes energy from the grid to feed the auxiliary loads and losses. Oftentimes, the energy rates that the wind farm operator pays for the energy consumed from the grid can be several times the energy rates the operator gets paid for the energy produced and supplied to the grid. Thus, the ESDs can be used to store energy at a low cost when the wind farm is producing power and to use that energy to supply the auxiliary loads and losses when the farm is not producing, thus offsetting the high cost of energy consumed.

However, the curtailment use case requires the ESDs to be kept at a low SOC in anticipation of an unpredictable curtailment event, whereas the auxiliary loads/losses use case requires the ESDs to be kept at a relatively high SOC in anticipation of drop in wind speeds that would result in the wind farm transitioning from producing to consuming energy.

In view of the aforementioned issues, it is desirable to provide a system and method to appropriate the ESD(s) for both use cases.

BRIEF DESCRIPTION

Aspects and advantages of the invention will be set forth in part in the following description, or may be obvious from the description, or may be learned through practice of the invention.

In one aspect, the present disclosure is directed to a method for operating at least one energy storage device of a renewable energy facility (such as a wind farm or a solar farm) connected to a power grid in multiple operational modes. The method includes providing an operational threshold for the renewable energy facility. Further, the method includes comparing an operational parameter of the renewable energy facility with respect to the operational threshold. The method also includes controlling the renewable energy facility based on the comparison. As such, when the operational parameter is below the operational threshold, the controller communicates to the energy storage device(s) to increase its state of charge (SOC) in anticipation of the renewable energy facility transitioning from producing power to consuming power. In contrast, when the operational parameter is at or above the operational threshold, the controller communicates to the energy storage device(s) to decrease its state of charge (SOC) in anticipation of a curtailment event of the power grid to prevent the renewable energy facility from releasing and sending power to the power grid.

In one embodiment, the operational threshold may be a power threshold and the operational parameter may be a power output. In such embodiments, the power threshold may equal to a predetermined percentage of a total power generated by the renewable energy facility. For example, in one embodiment, the predetermined percentage may be equal up to about 10% of the total power generated by the renewable energy facility.

In alternative embodiments, the operational threshold may be an energy threshold and the operational parameter may be an energy output. In such embodiments, the method may include receiving a forecasting input for the renewable energy facility, calculating an available energy to be produced before the renewable energy facility transitions from producing power to consuming power and an expected energy to be consumed for the duration that the renewable energy facility is consuming power, and maintaining, via the at least one energy storage device, a low SOC until the time that the available energy is deemed sufficient to partially or fully overcome the expected energy and then increasing the low SOC to a high SOC such that the at least one energy storage device is at the high SOC before the renewable energy facility transitions from producing power to consuming power.

In further embodiments, the method may include providing a filtering time delay when the operational parameter falls below the operational threshold before the at least one energy storage device begins to increase its SOC, i.e. to ensure that the fall is not a transient event.

In additional embodiments, when the operational parameter is below the operational threshold, the energy storage device(s) increases its SOC to a high SOC. In such embodiments, the method may include maintaining, via the energy storage device(s), the high SOC until a wind speed at the renewable energy facility drops below a wind speed that causes the renewable energy facility to transition from producing power to consuming power.

In another embodiment, the method may include providing power, via the energy storage device(s), to one or more auxiliary loads or losses until the renewable energy facility transitions from consuming power back to producing power again.

In several embodiments, the operational threshold may be a fixed threshold. In alternative embodiments, the operational threshold may vary based on a time of day, season, a forecasted power, a forecasted irradiance, or forecasted auxiliary loads and/or losses.

In another aspect, the present disclosure is directed to an energy storage system for a renewable energy facility connected to a power grid. The energy storage system includes at least one energy storage device capable of being operated in multiple operational modes for the renewable energy facility and a controller communicatively coupled to the energy storage device(s). The energy storage device(s) may include a battery, a fuel cell, a supercapacitor, pumped storage, compressed gas storage, a flywheel, or any other suitable energy storage device. Further, the controller is configured to perform one or more operations, including but not limited to providing an operational threshold for the renewable energy facility, comparing an operational parameter of the renewable energy facility with respect to the operational threshold, and controlling the renewable energy facility based on the comparison. As such, when the operational parameter is below the operational threshold, the controller communicates to the energy storage device(s) to increase its SOC in anticipation of the renewable energy facility transitioning from producing power to consuming power. In contrast, when the operational parameter is at or above the operational threshold, the controller communicates to the energy storage device(s) to decrease its SOC in anticipation of a curtailment event of the power grid which would prevent the renewable energy facility from releasing and sending power to the power grid. It should be understood that the energy storage system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for appropriating an energy storage device for both curtailment and auxiliary loads/losses, which are otherwise contradictory use cases. The curtailment use case of the energy storage device requires the energy storage device to be kept at a low SOC in anticipation of an unpredictable curtailment event, whereas the auxiliary loads/losses use case requires the energy storage device to be kept at a relatively high SOC in anticipation of drop in wind speeds that would result in the wind farm transitioning from producing to consuming energy. As such, the method of the present disclosure involves setting a threshold below which the energy storage device will begin to increase its SOC in anticipation of the wind farm transitioning from producing to consuming.

Figure 1:
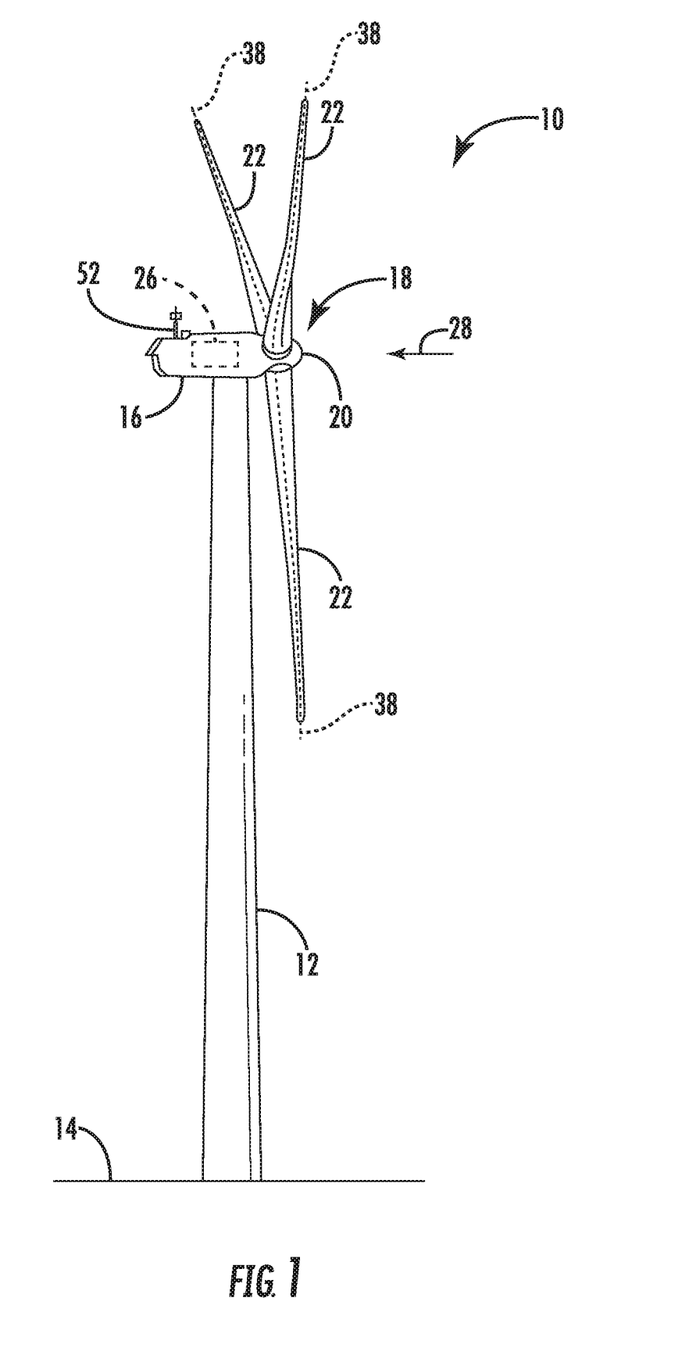
FIG. 1 illustrates a perspective view of one embodiment of a wind turbine according to the present disclosure.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
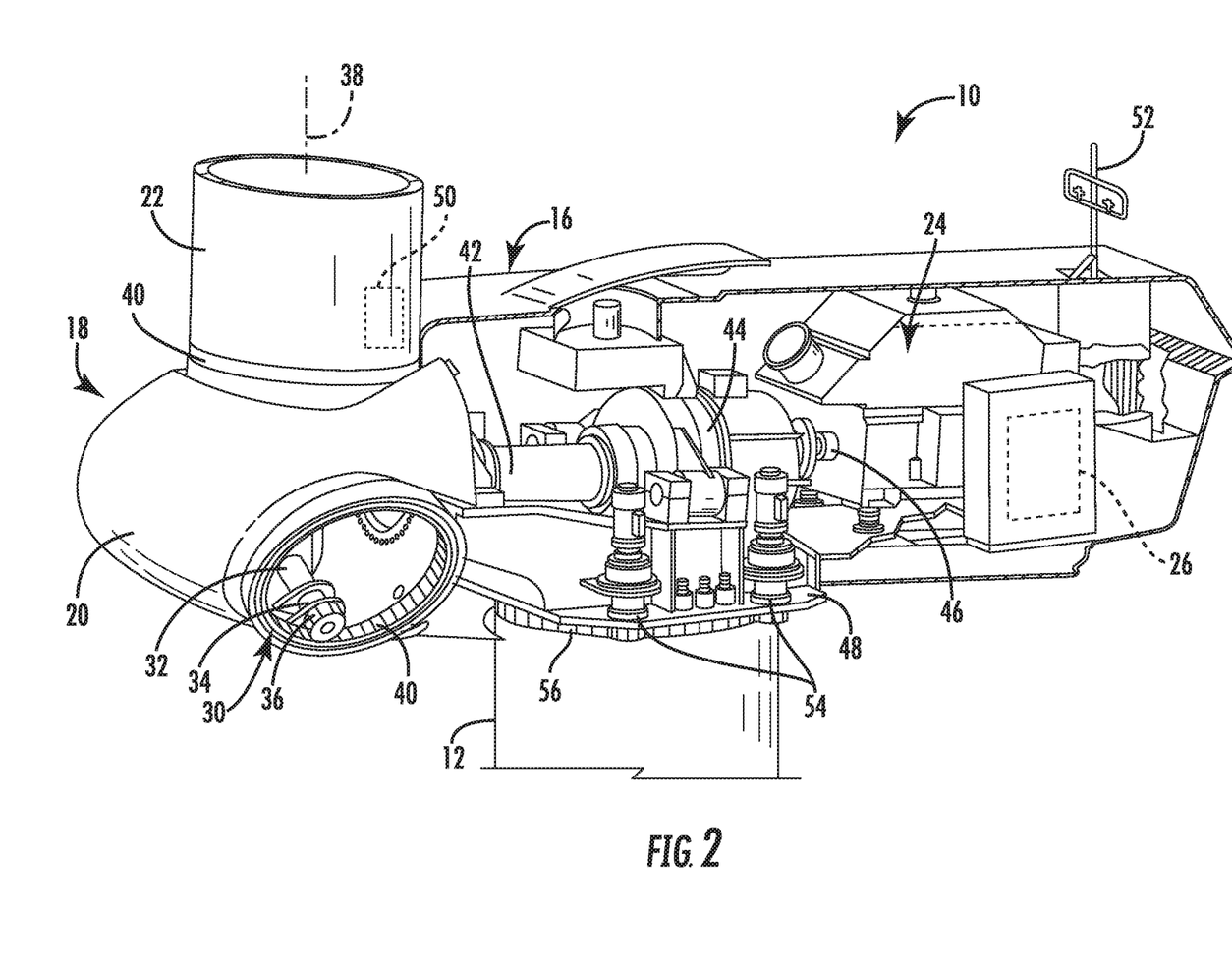
FIG. 2 illustrates a perspective, internal view of one embodiment of a nacelle of a wind turbine according to the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 46 coupled to the hub 20 for rotation therewith. The generator 24 may then be coupled to the main shaft 46 such that rotation of the main shaft 46 drives the generator 24. For instance, in the illustrated embodiment, the generator 24 includes a generator shaft 46 rotatably coupled to the main shaft 46 through a gearbox 44. However, in other embodiments, it should be appreciated that the generator shaft 46 may be rotatably coupled directly to the main shaft 46. Alternatively, the generator 24 may be directly rotatably coupled to the main shaft 46. In addition, as shown, it should be appreciated that the main shaft 46 may generally be supported within the nacelle 16 by a support frame or bedplate 48 positioned atop the wind turbine tower 12.

As shown in FIGS. 1 and 2, the wind turbine 10 may also include a turbine control system or a turbine controller 26 within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 30 configured to rotate each rotor blade 22 about its pitch axis 38. Further, each pitch adjustment mechanism 30 may include a pitch drive motor 32 (e.g., any suitable electric, hydraulic, or pneumatic motor), a pitch drive gearbox 34, and a pitch drive pinion 36. In such embodiments, the pitch drive motor 32 may be coupled to the pitch drive gearbox 34 so that the pitch drive motor 32 imparts mechanical force to the pitch drive gearbox 34. Similarly, the pitch drive gearbox 34 may be coupled to the pitch drive pinion 36 for rotation therewith. The pitch drive pinion 36 may, in turn, be in rotational engagement with a pitch bearing 40 coupled between the hub 20 and a corresponding rotor blade 22 such that rotation of the pitch drive pinion 36 causes rotation of the pitch bearing 40. Thus, in such embodiments, rotation of the pitch drive motor 32 drives the pitch drive gearbox 34 and the pitch drive pinion 36, thereby rotating the pitch bearing 40 and the rotor blade 22 about the pitch axis 38. Similarly, the wind turbine 10 may include one or more yaw drive mechanisms 54 communicatively coupled to the controller 26, with each yaw drive mechanism(s) 54 being configured to change the angle of the nacelle 16 relative to the wind (e.g., by engaging a yaw bearing 56 of the wind turbine 10).

In addition, as shown in FIG. 2, one or more sensors 50, 52 may be provided on the wind turbine 10. More specifically, as shown, a blade sensor 50 may be configured with one or more of the rotor blades 22 to monitor the rotor blades 22. Further, as shown, a wind sensor 52 may be provided on the wind turbine 10 for measuring various wind conditions. For example, the wind sensor 50 may a wind vane, and anemometer, a LIDAR sensor, or another suitable wind sensor. As such, the sensors 50, 52 may further be in communication with the controller 26, and may provide related information to the controller 26.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
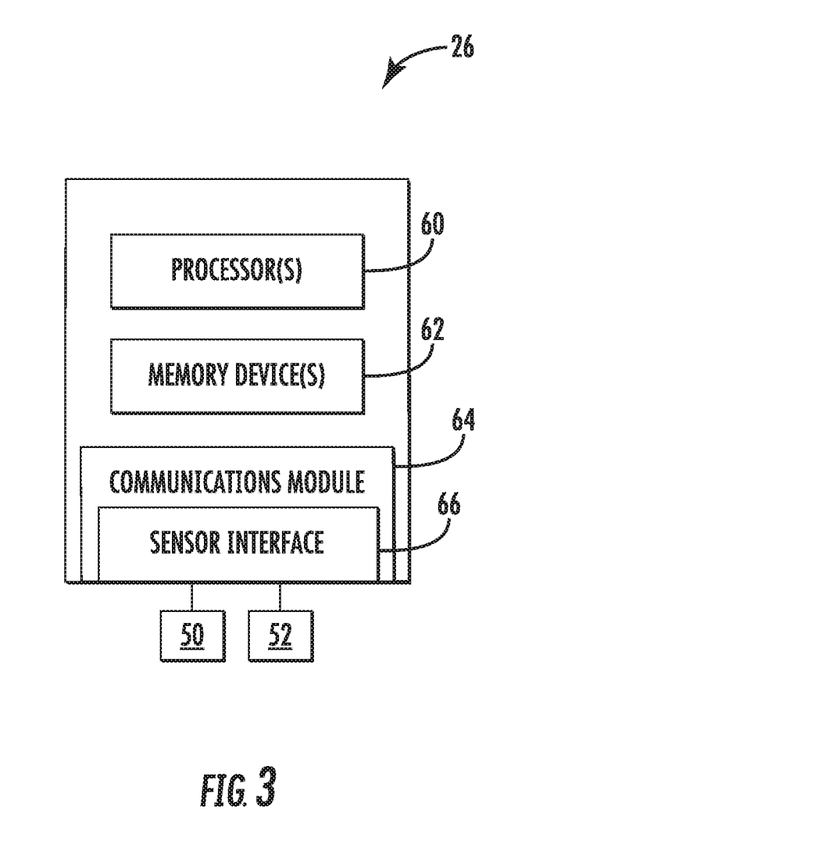
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controllers 26 according to the present disclosure. As shown, the controllers 26 of the present disclosure may include one or more processor(s) 60 and associated memory device(s) 62 configured to perform a variety of computer-implemented functions (e.g., performing the methods, steps, calculations and the like and storing relevant data as disclosed herein). Additionally, the controllers 26 may also include a communications module 64 to facilitate communications between the controllers 26 and the various components of the wind turbine 10. Further, the communications module 64 may include a sensor interface 66 (e.g., one or more analog-to-digital converters) to permit signals transmitted from one or more sensors 50, 52 to be converted into signals that can be understood and processed by the processors 60. It should be appreciated that the sensors 50, 52 may be communicatively coupled to the communications module 64 using any suitable means. For example, as shown in FIG. 3, the sensors 50, 52 are coupled to the sensor interface 66 via a wired connection. However, in other embodiments, the sensors 50, 52 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 4:
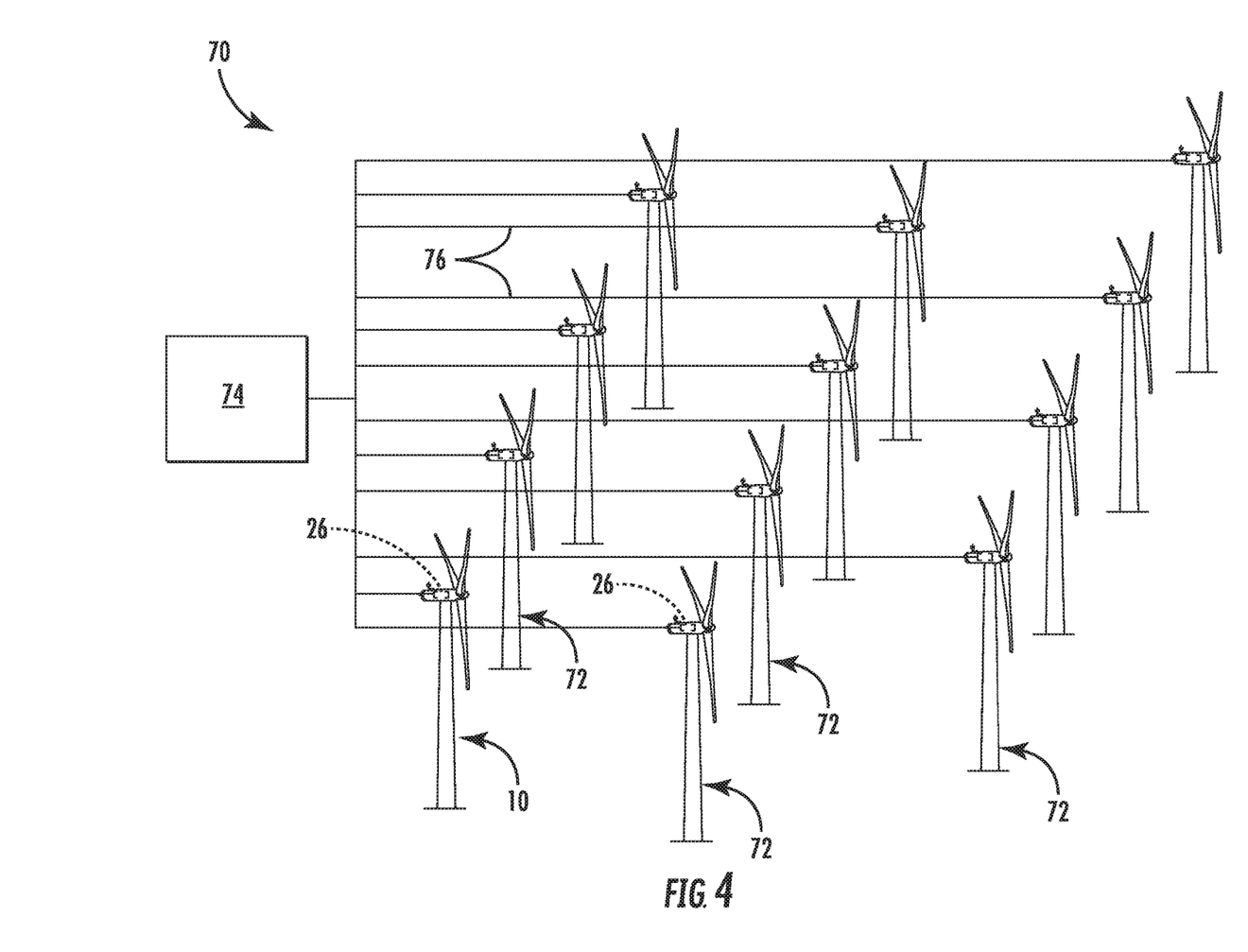
FIG. 4 illustrates a schematic view of one embodiment of a wind farm according to the present disclosure.

Referring now to FIG. 4, it should also be understood that the wind turbine 10 described herein may be part of a wind farm 70 according to present disclosure. As shown, the wind farm 70 may include a plurality of wind turbines 72, including the wind turbine 10 described above, and a farm-level controller 74. For example, as shown in the illustrated embodiment, the wind farm 70 includes twelve wind turbines, including wind turbine 10. However, in other embodiments, the wind farm 70 may include any other number of wind turbines, such as less than twelve wind turbines or greater than twelve wind turbines. In other embodiments, other sources of energy generation such as solar, chemical, geothermal, and/or thermal generation with or without energy storage devices may be added to the wind farm 70. In one embodiment, the controller 26 of the wind turbine 10 may be communicatively coupled to the farm-level controller 74 through a wired connection, such as by connecting the controller 26 through suitable communicative links 76 or networks (e.g., a suitable cable). Alternatively, the controller 26 may be communicatively coupled to the farm-level controller 74 through a wireless connection, such as by using any suitable wireless communications protocol known in the art. In addition, the farm-level controller 74 may be generally configured similar to the controller 26 for each of the individual wind turbines 72 within the wind farm 70.

Figure 5:
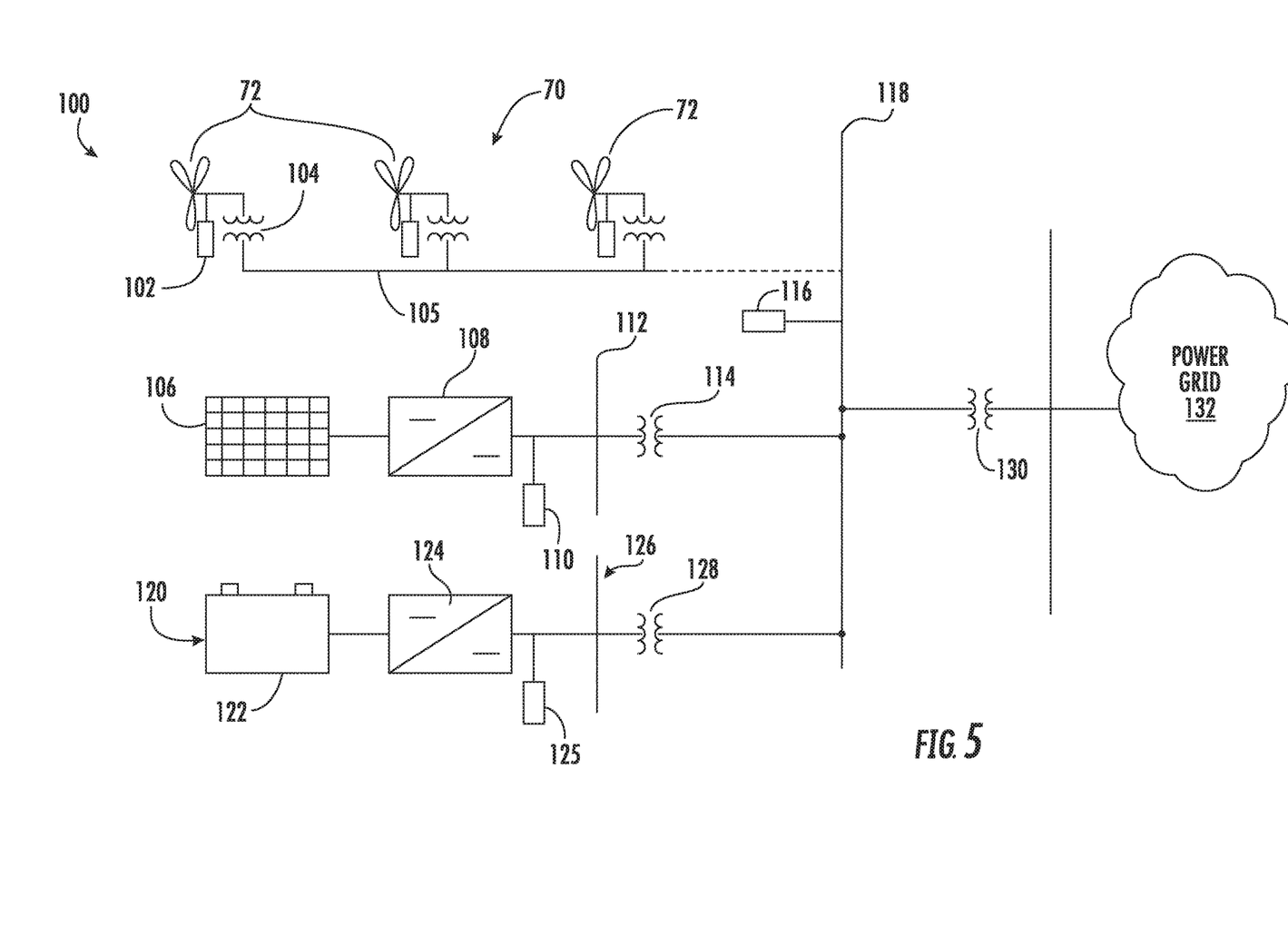
FIG. 5 illustrates a schematic diagram of one embodiment of a hybrid power system according to the present disclosure.

Referring now to the drawings, FIG. 5 illustrates a schematic diagram of one embodiment of a hybrid power system 100 according to the present disclosure. As shown, the illustrated hybrid power system 100 depicts multiple sources of power including, for example, the wind farm 70 having a plurality of wind turbines 72, one or more solar panels 106, and/or a battery power source 120. More specifically, as shown, the battery power source 120 described herein may be an electrical power source. For example, in certain embodiments, the battery power source 106 may include one or more energy storage devices (ESDs) 122, including but not limited to batteries (e.g. a lithium ion battery, a sodium nickel chloride battery, a sodium sulfur battery, a nickel metal hydride battery, a nickel cadmium battery, etc.), fuel cells, supercapacitors, pumped storage, compressed gas storage, flywheels, and/or any other suitable device in which, or means by which energy can be stored for later use. For example, in one embodiment, the battery power source 120 may include one or more sodium nickel chloride batteries.

Still referring to FIG. 5, the wind farm 70 may be incorporated into the system 100 via bus 105. In addition, as shown, each of the wind turbines 72 of the wind farm 70 may have associated loads 102 as well as losses 104. The auxiliary loads of the wind turbines 72 described herein may include, for example, energy consumed by the various components inside the nacelle 16 of the wind turbine 10 such as the yaw motors, various pumps, and/or heaters. Auxiliary losses of the power system 100 may include, for example, energy consumed by the no-load losses in the cables and the transformers in the wind farm 70. Further, as shown, the overall wind farm 70 may also have auxiliary loads 116. Moreover, as shown, the solar panel(s) 106 may be incorporated into the system 100 via a solar inverter 108 that is connected to a low voltage DC bus 112. As such, the solar inverter 108 may also be associated with various auxiliary loads 110 and losses 114.

The energy storage device(s) 122 may also be connected into the system 100 via an energy storage inverter 124 that is connected to a separate low voltage DC bus 126. Accordingly, the energy storage inverter 124 may further be associated with various auxiliary loads 125 and losses 128. The various components of the hybrid power system 100 can then be connected to the grid 132 via bus 118. The overall connection may also be associated with various losses 130 as well, e.g. from a main transformer of the power system 100.

During operation of the power system 100, the ESDs 122 can be used for various purposes. For example, one use for the ESDs 122 is to store the energy produced by the wind turbines 10 in the wind farm 70 when the wind farm 70 is curtailed by a grid operator and to release and sell the energy when the curtailment is lifted. Oftentimes, the timing of such curtailment events is not predictable by wind farm operators. This unpredictability necessitates that the ESDs 122 be kept at a very low state of charge (SOC) in anticipation of a curtailment event. The ESDs 122 can also be used to supply the energy consumed by the auxiliary loads and losses inside the wind farm 70.

When the wind farm 70 is producing power, the energy the farm outputs to the grid is net of the above auxiliary loads and losses. When the wind speeds are low and the wind farm 70 is not generating power, the farm consumes energy from the grid to feed the auxiliary loads and losses. However, oftentimes, the energy rates that the wind farm operator pays for the energy consumed from the grid can be several times the energy rates the operator gets paid for the energy produced and supplied to the grid. As such, the ESDs 122 can be used to store energy at a low cost when the wind farm 70 is producing power and to use that energy to supply the auxiliary loads and losses when the wind farm 70 is not producing, thus offsetting the high cost of energy consumed.

However, the curtailment use case requires the ESDs 122 to be kept at a low SOC in anticipation of an unpredictable curtailment event while the auxiliary loads/losses use case requires the ESDs 122 to be kept at a relatively high SOC in anticipation of drop in wind speeds that would result in the wind farm transitioning from producing to consuming energy. Therefore, the present disclosure is directed to systems and methods for operating the wind farm 70 such that the ESDs 122 would be capable of providing both curtailment and the auxiliary loads/losses use cases.

Figure 6:
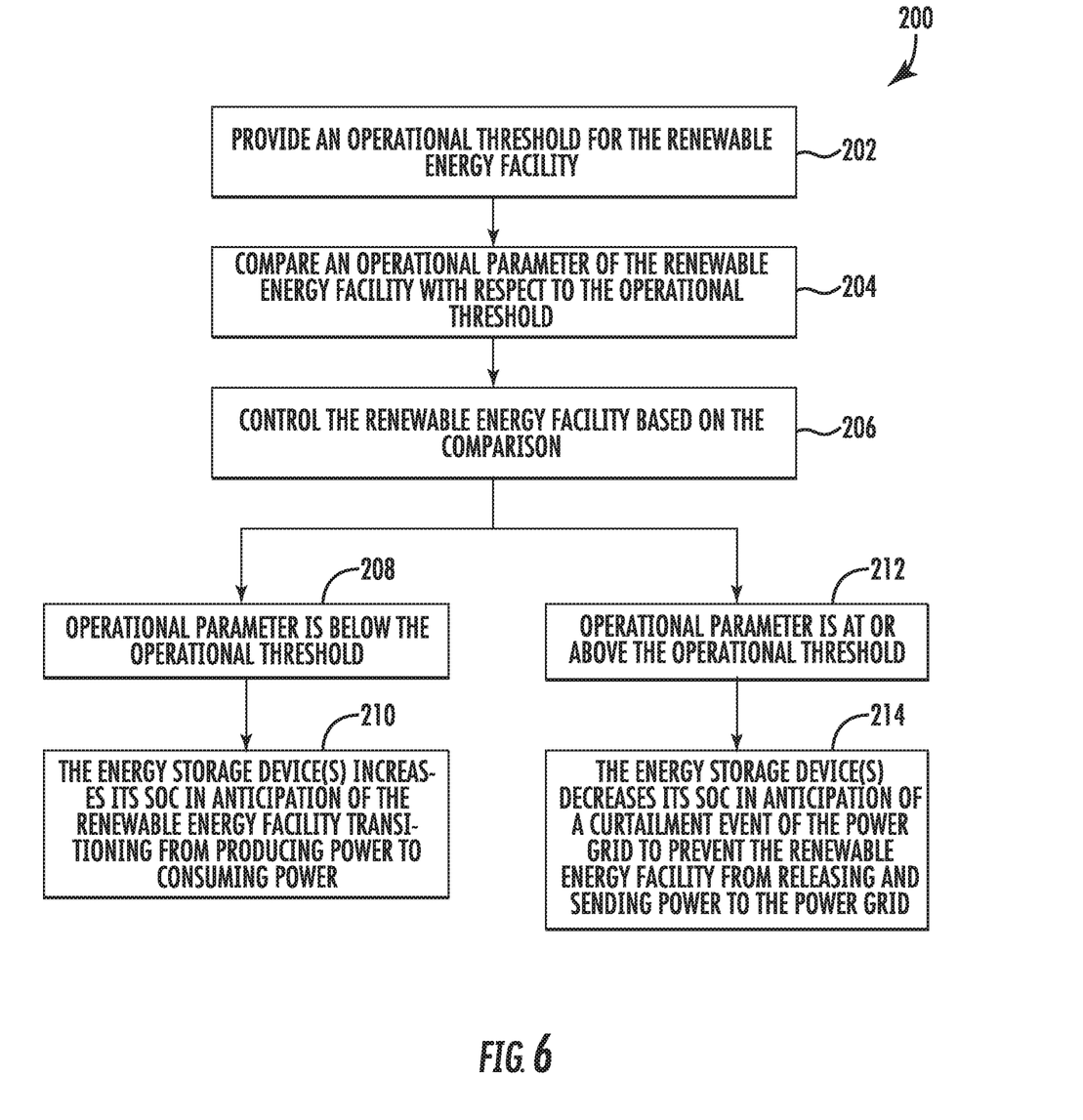
FIG. 6 illustrates a flow diagram of one embodiment of a method for operating at least one energy storage device of a renewable energy facility (such as a wind farm or a solar farm) connected to a power grid in multiple operational modes according to the present disclosure.

Referring now to FIG. 6, a flow diagram of one embodiment of a method 200 for operating at least one energy storage device of a renewable energy facility (such as a wind farm or a solar farm) connected to a power grid in multiple operational modes is illustrated. In general, the method 200 will be described herein with reference to the wind farm 70 shown in FIG. 6. However, it should be appreciated that the disclosed method 200 may be implemented with any renewable energy facility having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 202, the method 200 includes receiving an operational threshold for the wind farm 70. For example, in one embodiment, the operational threshold may be a power threshold and the operational parameter may be a power output as discussed in more detail herein with reference to FIG. 7. In alternative embodiments, the operational threshold may be an energy threshold and the operational parameter may be an energy output as discussed in more detail herein with reference to FIG. 8. In addition, the operational threshold can be fixed or dynamic (i.e. variable) based on time of day or season.

As shown at 204, the method 200 includes comparing an operational parameter (such as power or energy output) of the wind farm 70 with respect to the operational threshold. As shown at 206, the method 200 includes controlling the wind farm 70 based on the comparison. More specifically, as shown at 208 and 210, when the operational parameter is below the operational threshold, the controller (i.e. the turbine controller 26) may instruct the energy storage device(s) 122 to increase its SOC in anticipation of the wind farm 70 transitioning from producing power to consuming power. In additional embodiments, when the operational parameter is below the operational threshold, the controller (i.e. the turbine controller 26) may instruct the energy storage device(s) 122 to increase its SOC to a high SOC and maintains the high SOC until the wind speed at the wind farm 70 drops below a wind speed that causes the farm to transition from producing power to consuming power.

In contrast, as shown at 212 and 214 of FIG. 6, when the operational parameter is at or above the operational threshold, the controller (i.e. the turbine controller 26) may instruct the energy storage device(s) 122 to decrease its SOC in anticipation of a curtailment event of the power grid to prevent the wind farm 70 from releasing and sending power to the power grid. For example, in one embodiment, the controller (i.e. the turbine controller 26) may instruct the energy storage device(s) 122 to provide power to one or more auxiliary loads or losses until the wind farm 70 transitions from consuming power back to producing power again.

Figure 7:
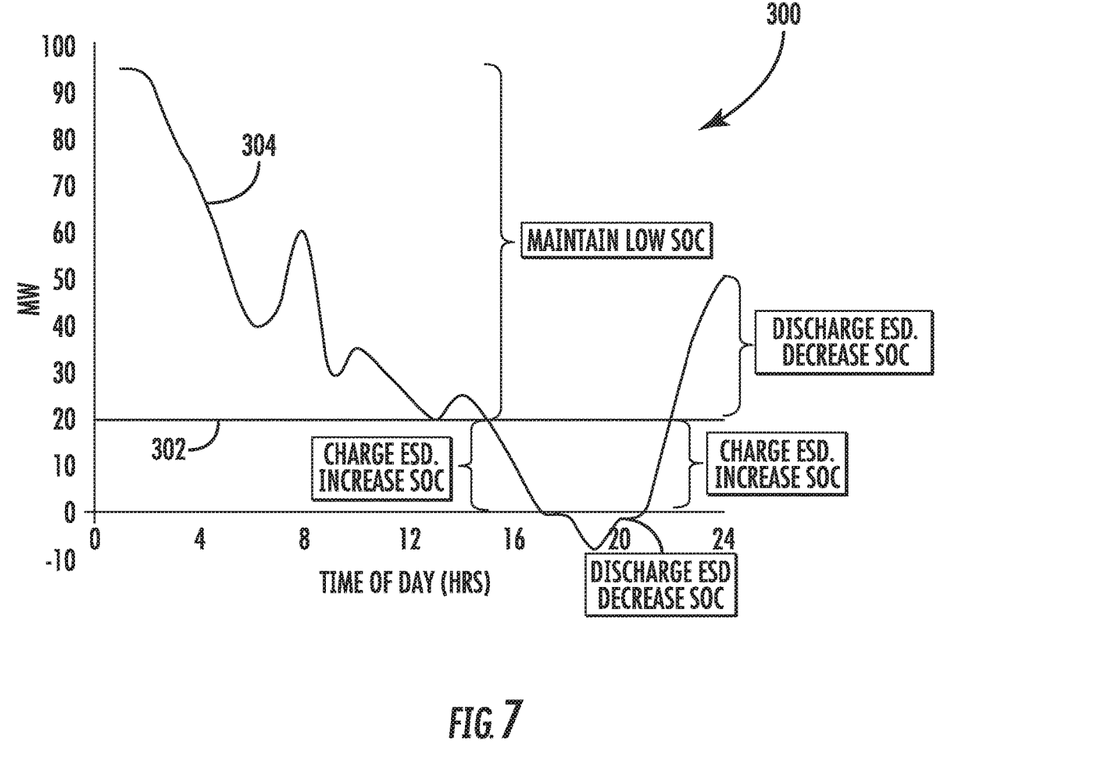
FIG. 7 illustrates an example graph of one embodiment of the power produced by a 100 Megawatt (MW) wind farm during a 24-hour period according to the present disclosure.
Figure 8:
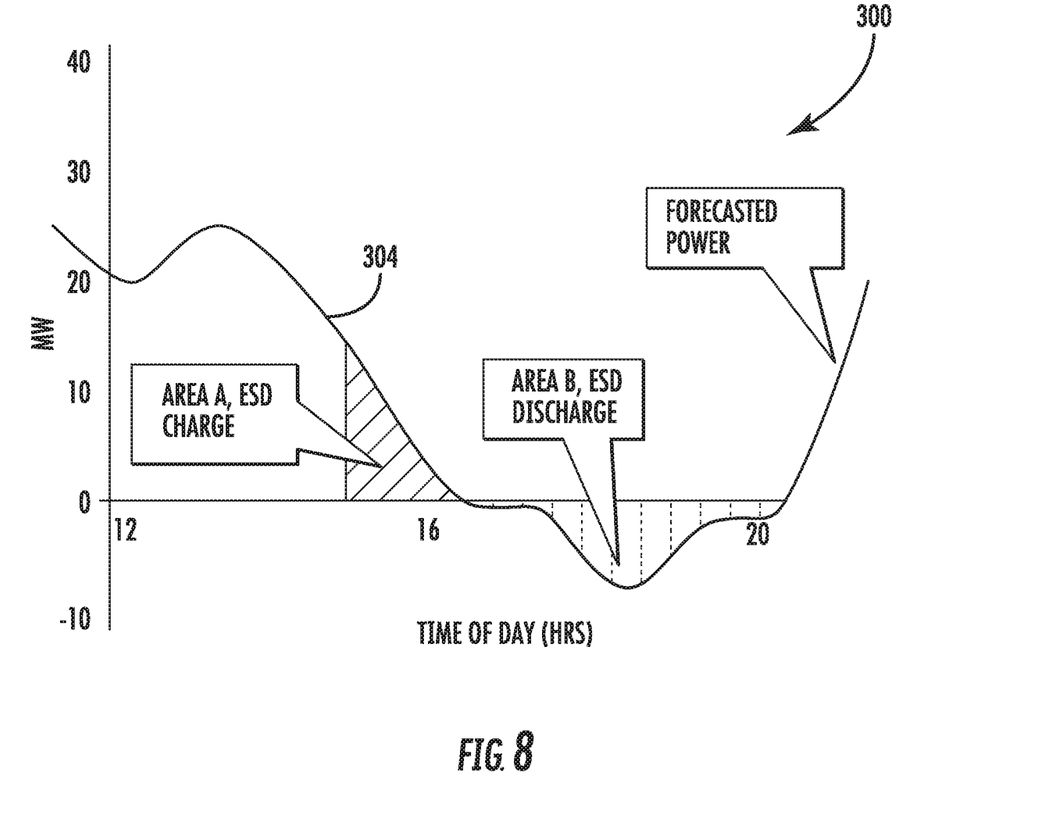
FIG. 8 illustrates another example graph of one embodiment of the power produced by a 100 Megawatt (MW) wind farm during a 24-hour period according to the present disclosure.

The method 200 of the present disclosure can be better understood with respect to the graphs 300 illustrated in FIGS. 7 and 8. Referring particularly to FIG. 7, the operational threshold 302 can be a simple power threshold, e.g. if the wind farm 70 does not have forecasting input. In such embodiments, the power threshold may equal to a predetermined percentage of a total power generated by the renewable energy facility, e.g. the wind farm 70. For most wind farms, the auxiliary loads and losses are a small fraction of the total energy generated. This allows the power threshold 302 to be set at a very small percentage of the park power output. For example, in one embodiment, the predetermined percentage may be less than about 10% of the total power generated by the renewable energy facility. Accordingly, the low threshold allows the energy storage device(s) 122 to be fully appropriated for the auxiliary loads/losses use case and almost all of the application space for the curtailment use case.

In addition, as shown, the example graph 300 illustrates the power 304 produced by a 100 Megawatt (MW) wind farm during a 24-hour period is shown. Further, as shown, the power threshold 302 is set at 20 MW. Moreover, as shown, for the first several hours of the day, the wind farm 70 has an output above the 20 MW threshold which results in the energy storage device(s) (ESD) 122 having a low SOC in anticipation of a curtailment event. At around 15:00 hours, the output of the wind farm 70 falls below the power threshold 302. At this time, the energy storage device(s) 122 begins to charge after a small filtering time delay to ensure that the power dip below the power threshold 302 is not a transient event. In addition, as shown, the energy storage device(s) 122 maintains a high SOC until the wind speed drops to a level that causes the wind farm 70 to transition from producing to consuming (e.g. at around 17:00 hours). The energy storage device(s) 122 then powers the auxiliary loads and/or losses (as shown by the negative power in the graph 300) until the wind farm 70 begins producing power again (e.g. at around 21:00 hours). At this time, the energy storage device(s) 122 begins to charge in anticipation of another wind speed drop off which does not happen. At around 22:00 hours, the power goes above the power threshold 302, thereby resulting in the energy storage device(s) 122 giving up its SOC after a small time delay to await a possible curtailment event.

Referring now to FIG. 8, the operational threshold may correspond to an energy threshold instead of a power threshold, e.g. if the wind farm 70 receives a forecasting input. As such, the forecasting input can provide further optimization of the SOC of the energy storage device(s) 122 to fulfill both use cases better. More specifically, as shown, FIG. 8, illustrates the same power curve 300 as FIG. 7, but with certain areas of interest zoomed in.

With forecasting, it is possible to calculate the energy available to be produced before the wind farm 70 transitions from production to consumption (e.g. area A) as well as the energy expected to be consumed for the duration that the wind farm 70 is consuming (e.g. area B). In the example, the energy storage device(s) 122 maintains a low SOC until the time that forecasted area A becomes equal to or slightly greater than forecasted area B. The energy storage device(s) 122 can then be charged from the low SOC value to a high SOC value before the wind farm 70 transitions to consumption.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating at least one energy storage device of a renewable energy facility connected to a power grid in multiple operational modes, the method comprising:
   providing, via a controller, a power threshold for the renewable energy facility, the power threshold being equal to a power value greater than zero;
   comparing, via the controller, a power output of the renewable energy facility with respect to the power threshold; and,
   controlling, via the controller, the renewable energy facility based on the comparison,
   wherein, when the power output is below the power threshold, the controller communicates to the at least one energy storage device to increase a state of charge (SOC) of the at least one energy storage device in anticipation of the renewable energy facility transitioning from producing power to consuming power, and
   wherein, when the power output is at or above the power threshold, the controller communicates to the at least one energy storage device to decrease the SOC of the at least one energy storage device in anticipation of a curtailment event of the power grid to prevent the renewable energy facility from releasing and sending power to the power grid, and
   wherein, when the power output is below the power threshold, the controller communicates to the at least one energy storage device to increase the SOC of the at least one energy storage device to a high SOC in anticipation of the renewable energy facility transitioning from producing power to consuming power, the method further comprising maintaining, via the at least one energy storage device, the high SOC until a wind speed at the renewable energy facility drops below a wind speed that causes the renewable energy facility to transition from producing power to consuming power.

2. The method of claim 1, wherein the power threshold is equal to a predetermined percentage of a total power generated by the renewable energy facility, the predetermined percentage comprising up to about 10% of the total power generated by the renewable energy facility.

3. The method of claim 1, further comprising:
receiving a forecasting input for the renewable energy facility;
calculating an available energy to be produced before the renewable energy facility transitions from producing power to consuming power and an expected energy to be consumed for the duration that the renewable energy facility is consuming power; and
maintaining, via the at least one energy storage device, a low SOC until the time that the available energy is deemed sufficient to partially or fully overcome the expected energy and then increasing the low SOC to a high SOC such that the at least one energy storage device is at the high SOC before the renewable energy facility transitions from producing power to consuming power.

4. The method of claim 1, further comprising providing a filtering time delay when the power output falls below the power threshold before the at least one energy storage device begins to increase the SOC of the at least one energy storage device.

5. The method of claim 1, further comprising providing power, via the at least one energy storage device, to one or more auxiliary loads or losses until the renewable energy facility transitions from consuming power back to producing power again.

6. The method of claim 1, wherein the power threshold is a fixed threshold.

7. The method of claim 1, wherein the power threshold varies based on at least one of a time of day, season, a forecasted power, a forecasted irradiance, or forecasted auxiliary loads and/or losses.

8. The method of claim 1, wherein the renewable energy facility comprises at least one of a wind farm or a solar farm.

9. An energy storage system for a renewable energy facility connected to a power grid, the energy storage system comprising:
at least one energy storage device capable of being operated in multiple operational modes for the renewable energy facility; and,
a controller communicatively coupled to the at least one energy storage device, the controller configured to perform one or more operations, the one or more operations comprising:
providing a power threshold for the renewable energy facility;
comparing a power output of the renewable energy facility with respect to the power threshold; and
controlling the renewable energy facility based on the comparison,
wherein, when the power output is below the power threshold, the controller communicates to the least one energy storage device to increase a state of charge (SOC) of the at least one energy storage device in anticipation of the renewable energy facility transitioning from producing power to consuming power, and
wherein, when the power output is at or above the power threshold, the controller communicates to the least one energy storage device to decrease the SOC of the at least one energy storage device in anticipation of a curtailment event of the power grid to prevent the renewable energy facility from releasing and sending power to the power grid, and
wherein, when the power output is below the power threshold, the at least one energy storage device increases the SOC of the at least one energy storage device to a high SOC in anticipation of the renewable energy facility transitioning from producing power to consuming power, the one or more operations further comprising maintaining, via the at least one energy storage device, the high SOC until a wind speed at the renewable energy facility drops below a wind speed that causes the renewable energy facility to transition from producing power to consuming power.

10. The system of claim 9, wherein the power threshold is equal to a predetermined percentage of a total power generated by the renewable energy facility, the predetermined percentage comprising up to about 10% of the total power generated by the renewable energy facility.

11. The system of claim 9, further comprising:
receiving a forecasting input for the renewable energy facility;
calculating an available energy to be produced before the renewable energy facility transitions from producing power to consuming power and an expected energy to be consumed for the duration that the renewable energy facility is consuming power; and
maintaining, via the at least one energy storage device, a low SOC until the time that the available energy is deemed sufficient to partially or fully overcome the expected energy and then increasing the low SOC to a high SOC such that the at least one energy storage device is fully charged before the renewable energy facility transitions from producing power to consuming power.

12. The system of claim 9, wherein the one or more operations further comprise providing power, via the at least one energy storage device, to one or more auxiliary loads or losses until the renewable energy facility transitions from consuming power back to producing power again.

13. The system of claim 9, wherein the renewable energy facility comprises at least one of a wind farm or a solar farm.

14. The system of claim 9, wherein the at least one energy storage device comprises at least one of a battery, a fuel cell, a supercapacitor, pumped storage, compressed gas storage, or a flywheel.

* * * * *